United States Patent [19]

Witzke

[11] 4,097,655

[45] Jun. 27, 1978

[54] PHOTOGALVANIC CELL USING A TRANSPARENT CONDUCTING ELECTRODE

[75] Inventor: Horst Witzke, Princeton, N.J.

[73] Assignees: Optel Corporation, Princeton, N.J.; Grumman Aerospace Corporation, Bethpage, N.Y.; part interest to each

[21] Appl. No.: 706,078

[22] Filed: Jul. 16, 1976

[51] Int. Cl.² ........................ H01M 6/30; H01M 6/36
[52] U.S. Cl. ................................................. 429/111
[58] Field of Search .................... 429/111; 136/89 NB

[56] References Cited

U.S. PATENT DOCUMENTS

| | | | |
|---|---|---|---|
| 3,057,945 | 10/1962 | Rinnovatore et al. | 136/83 |
| 3,708,220 | 1/1973 | Meyers et al. | 350/160 R |
| 3,844,843 | 10/1974 | Kay et al. | 136/89 X |
| 3,989,542 | 11/1976 | Clark | 429/111 X |
| 4,037,029 | 7/1977 | Anderson | 429/111 |

OTHER PUBLICATIONS

H. Gerischer et al., "Photoelektrochemische Prozesse und Photokatalyse an Zinkoxid-Suspensionen und Zinkoxid-Deckschichten," *Ber. Bunsen Gesell.*, vol. 76, pp. 385–388, (1972).

*Primary Examiner*—Aaron Weisstuch
*Attorney, Agent, or Firm*—Morris Liss; Israel Gopstein

[57] ABSTRACT

A photogalvanic cell includes an electrode and counterelectrode supported on a substrate with a semi-solid electrolyte layer intervening therebetween. Titanium oxide is suspended in the electrolyte. A voltage appears between the electrode and counterelectrode in response to light. Charge storage is exhibited by the cell after light is removed.

7 Claims, 2 Drawing Figures

PHOTOGALVANIC CELL USING A TRANSPARENT CONDUCTING ELECTRODE

FIELD OF THE INVENTION

The present invention relates to photogalvanic cells, and more particularly to a photogalvanic cell that is capable of storing charge thus acting as a battery.

BRIEF DESCRIPTION OF THE PRIOR ART

In my prior co-pending patent application Ser. No. 582,344, filed May 30, 1975, a photogalvanic cell was described which constitutes a novel device. The device can be photo-charged using ultra-violet light and induced charge can be stored for a prolonged period of time for later use. The same device is also capable of immediately converting light into useful electrical energy.

The referenced prior art device includes a charge storage layer and a separate compensating layer between an electrode and counterelectrode. One disadvantage of the prior art device resides in the fact that the charge storage layer has a tendency to become colored after considerable exposure to light thereby acting as a filter and reducing energy conversion efficiency.

BRIEF DESCRIPTION OF THE PRESENT INVENTION

The present invention is an improvement over the discussed prior art. It has been determined that the charge storage layer, which was considered necessary, may be eliminated and a simplified structure will be produced that does not suffer from the coloration previously mentioned. Further, the present invention is a more simple structure to fabricate than the discussed prior art device.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
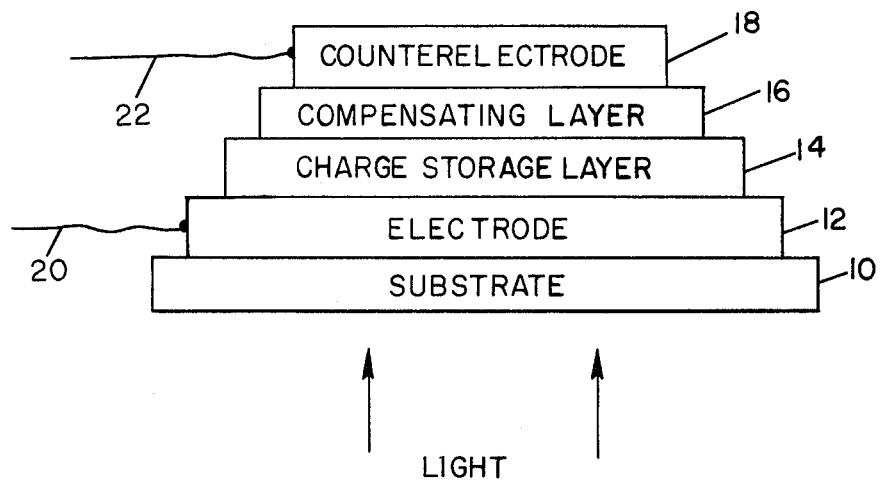
FIG. 1 is a cross sectional view of the various layers that comprised the prior art device.

FIG. 1 illustrates the cross sectional layer configuration of a device such as disclosed in my prior patent application. A transparent substrate such as glass 10 is covered with a transparent or translucent conducting electrode 12. Such a combination of substrate and electrode may be commercially purchased and is well known in the trade as NESA glass. The electrode 12 is covered by an additional layer 14 which stores charge. As an example of a suitable material, the aforementioned application mentions tungsten oxide ($WO_3$). The layer 14 is in turn covered with a compensating layer 16 which is in the form of a semi-solid electrolyte including a transition metal oxide, such as the compound titanium oxide ($TiO_2$). Finally, a counterelectrode layer 18 covers the compensating layer 16 and may be made from the element carbon. A lead 20 is connected to the conducting electrode 12 while a second lead 22 is connected to the counterelectrode layer 18. When the device shown in FIG. 1 is exposed to light in the direction illustrated, there will be an immediate conversion of light energy to electrical energy and a voltage will be created between the leads 20 and 22. After some exposure to light, charges will be stored in the charge storage layer 14. It is suspected that the charges become primarily produced in the compensating layer 16 while they are primarily stored in the charge storage layer 14.

Although the device illustrated in FIG. 1 operates satisfactorily, it is a relatively expensive device to fabricate. Further, the charge storage layer 14 has a tendency to become colored after considerable exposure to light. As a result, the charge storage layer 14 acts as a filter and reduces the energy conversion capability of the device. Accordingly, it is desirable to produce a cell of the type disclosed which will obviate the problem of coloration for the charge storage layer as well as creating a device that may be more economically produced.

Figure 2:
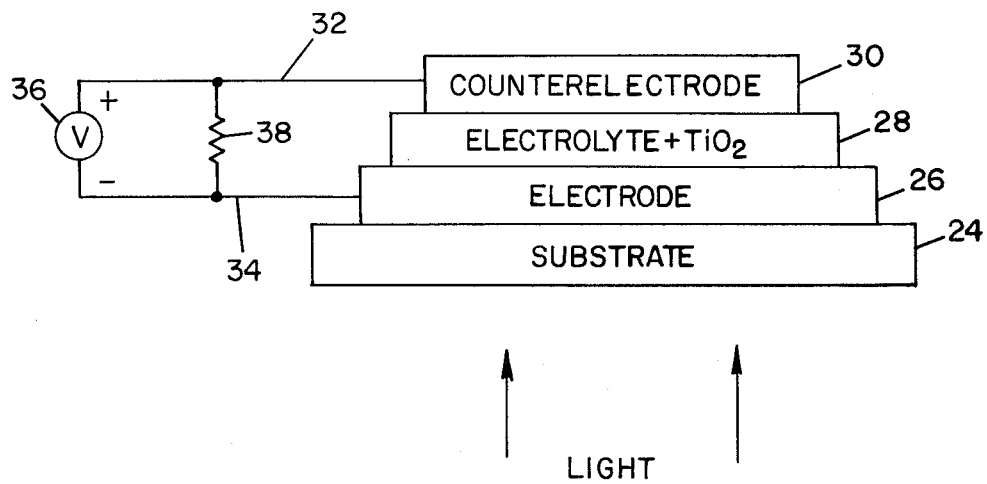
FIG. 2 is a cross sectional view of the present invention which is a simplified structure when compared to the prior art.

FIG. 2 illustrates the structure of the present invention. As will be noticed by comparison with the prior art structure of FIG. 1, the charge storage layer 14 is absent. Otherwise, the structure remains the same. Thus, the present invention is a simplification of the previous photogalvanic device of FIG. 1. An unexpected result is obtained by the present invention since it was previously thought that the tungsten oxide material in layer 14 was necessary for charge storing purposes. It has now been discovered that the layers of FIG. 2 may be fabricated in the fashion shown and that the transition metal exemplified by $TiO_2$ in layer 28 will generate the charges and that the device will store these charges.

With reference to FIG. 2, the particular structure of the present invention will be discussed. A glass substrate material 24 and conducting electrode or layer 26 may again be the NESA glass as is used in connection with the prior art embodiment of FIG. 1. The electrode 26 is covered by a layer 28 which is identical to the compensating layer 16 of FIG. 1. This layer includes a light passing semi-solid electrolyte with $TiO_2$ material suspended therein. The $TiO_2$ is generally used in the form of a powder which is mixed with the semi-solid electrolyte. The semi-solid electrolyte material may be identical to that of the compensating layer 16 of FIG. 1 and may include sulfuric acid, glycerine and water constituents. A final carbon layer serves as counterelectrode 30. Leads 32 and 34 are respectively connected to the counterelectrode 30 and the electrode 26. A voltmeter 36 placed across these leads will demonstrate a voltage when the cell is exposed to light as is illustrated in the figure. A load 38 may be placed across the leads 32 and 34 for conducting current therethrough. It is noteworthy that the device shown in FIG. 2 will momentarily, upon exposure to light, convert the light to electrical energy for use by the load 38. In addition, after a relatively short exposure to the light, charges will be stored by the device and after the light no longer exposes the cell, current will continue to flow through the load 38. Thus, the cell illustrated in FIG. 2, like its more complex counterpart prior art embodiment of FIG. 1, has the capability of acting as a battery as well as a photogalvanic cell which momentarily converts light energy to electrical energy.

The present invention does not suffer from the discoloration of a charge storage layer as was the case in connection with the charge storage layer 14 of FIG. 1.

In addition, the more simple structure of FIG. 2 permits fabrication of the cell in a more economical manner.

The TiO₂ may be used in the rutile form as well as the anatase form.

It should be understood that the invention is not limited to the exact details of construction shown and described herein for obvious modifications will occur to persons skilled in the art.

I claim the following:

1. A photogalvanic cell comprising a light passing substrate;

a light transmissive electrode supported by the substrate;

a counterelectrode located in spaced registry from the electrode;

semi-solid electrolyte means containing titanium dioxide positioned between the electrode and the counterelectrode for cooperating therewith to convert impinging light energy to electrical energy and for retaining electrical charge after removal of light.

2. The subject matter set forth in claim 1 together with leads connected to the electrode and the counterelectrode for enabling the connection of a load thereacross.

3. The subject matter set forth in claim 1 wherein the TiO₂ is utilized in the rutile form.

4. The subject matter set forth in claim 1 wherein the TiO₂ is utilized in the anatase form.

5. A photogalvanic cell comprising a light passing substrate;

a light passing electrode supported by the substrate;

an opaque counterelectrode located in spaced registry from the electrode;

a layer of semi-solid electrolyte located between the electrode and the counterelectrode, the electrolyte having powdered titanium dioxide suspended therein; and leads connected to the electrode and the counterelectrode for enabling the connection of a load thereacross;

the cell converting light energy to electrical energy when exposed to light, the cell maintaining an electrical charge when the light is removed.

6. The subject matter set forth in claim 5 wherein the TiO₂ is utilized in the rutile form.

7. The subject matter as set forth in claim 5 wherein the TiO₂ is utilized in the anatase form.

* * * * *